US012619904B2

(12) United States Patent (10) Patent No.: US 12,619,904 B2
Cui et al. (45) Date of Patent: May 5, 2026

(54) APPARATUS AND METHOD FOR PREDICTING TRANSFORMER STATE IN CONSIDERATION OF WHETHER OIL FILTERING IS PERFORMED

(71) Applicant: OnePredict Co., Ltd, Seoul (KR)

(72) Inventors: Jin Shi Cui, Seoul (KR); Jae Kyung Shin, Seoul (KR); Bo Seong Seo, Seoul (KR)

(73) Assignee: ONEPREDICT CO., LTD., Seoul (KR)

( * ) Notice: Subject to any disclaimer, the term of this patent is extended or adjusted under 35 U.S.C. 154(b) by 1257 days.

(21) Appl. No.: 16/949,809

(22) Filed: Nov. 16, 2020

(65) Prior Publication Data

US 2022/0019937 A1 Jan. 20, 2022

(30) Foreign Application Priority Data

Jul. 20, 2020 (KR) ........................ 10-2020-0089642
Sep. 22, 2020 (KR) ........................ 10-2020-0121939

(51) Int. Cl.
*G06N 20/00* (2019.01)
*B01D 19/00* (2006.01)
*H01F 27/12* (2006.01)

(52) U.S. Cl.
CPC ......... *G06N 20/00* (2019.01); *B01D 19/0031* (2013.01); *H01F 27/12* (2013.01)

(58) Field of Classification Search
CPC .................................................... G06N 20/00
See application file for complete search history.

(56) References Cited

U.S. PATENT DOCUMENTS

| | | | | |
|---|---|---|---|---|
| 9,652,723 B2 * | 5/2017 | Anderson | .......... | G05B 23/0283 |
| 2014/0222355 A1 * | 8/2014 | Cheim | .................. | G05B 23/024 |
| | | | | 702/58 |
| 2016/0140263 A1 * | 5/2016 | Rojas | ..................... | G05B 23/02 |
| | | | | 703/18 |
| 2019/0293697 A1 * | 9/2019 | Gross | ................. | G01R 19/2513 |
| 2021/0035027 A1 * | 2/2021 | Santos | ................... | G06N 20/00 |

(Continued)

FOREIGN PATENT DOCUMENTS

| | | |
|---|---|---|
| JP | 2006-308515 A | 11/2006 |
| KR | 10-2012-0053120 A | 5/2012 |

OTHER PUBLICATIONS

Mokhnache et al. Application of neural networks paradigms in the diagnosis and thermal ageing prediction of transformer oil, Jul. 12, 2002, IEEE (Year: 2002).*

(Continued)

*Primary Examiner* — Usmaan Saeed
*Assistant Examiner* — Beatriz Ramirez Bravo
(74) *Attorney, Agent, or Firm* — Mark T. Vogelbacker; Eckert Seamans Cherin & Mellott, LLC

(57) ABSTRACT

A method of predicting a transformer state in consideration of whether oil filtering is performed includes receiving, by a transformer state prediction apparatus, transformer data of a transformer, determining, by the transformer state prediction apparatus, whether an oil of the transformer is filtered on the basis of the transformer data, and predicting, by the transformer state prediction apparatus, a state of the transformer on the basis of different prediction models depending on whether the oil is filtered.

12 Claims, 7 Drawing Sheets

(56) References Cited

U.S. PATENT DOCUMENTS

2021/0089900 A1*  3/2021  He ........................ G06N 3/045
2021/0350050 A1* 11/2021  He .......................... G06N 3/08

OTHER PUBLICATIONS

Shintemirov et al., "Power Transformer Fault Classification Based on Dissolved Gas Analysis by Implementing Bootstrap and Genetic Programming", (2009) (Year: 2009).*
Jiang et al., "Dynamic Fault Prediction of Power Transformers Based on Hidden Markov Model of Dissolved Gases Analysis", (2019) (Year: 2019).*
Chatterjee et al., "Health Monitoring of Power Transformers by Dissolved Gas Analysis using Regression Method and Study the Effect of Filtration of Oil", (2009) (Year: 2009).*
Pereira et al., "Nonlinear Autoregressive Neural Network Models for Prediction of Transformer Oil-Dissolved Gas Concentrations", (2018) (Year: 2018).*
Suwanasri et al., "Failure Statistics and Power Transformer Condition Evaluation by Dissolved Gas Analysis Technique", (2008) (Year: 2008).*
Soni et al., "Condition Monitoring of Power Transformer Using Dissolved Gas Analysis of Mineral Oil: A Review", (2015) (Year: 2015).*
Haema et al., "A Prediction Technique of Power Transformer Condition Assesment via DGA Parameters", (2013) (Year: 2013).*
Song et al., "Power Transformer Operating State Prediction Method Based on an LSTM Network" (2018) (Year: 2018).*
Su et al., "Prediction Method for Transformer State Based on GRU Network" (published in conference held from Jul. 13-15, 2020) (Year: 2020).*
Office Action dated Feb. 14, 2022 from corresponding Korean Application No. 10-2020-0121939.

* cited by examiner

FIRST SUB-PREDICTION MODEL (OIL FILTERING)(400)
"Critical"

FIRST OIL-FILTERING DATA SET(410)
{THIRD STATE (CRITICAL)}

FIRST SUB-PREDICTION MODEL (OIL FILTERING)(400)
"normal"
"warning"
"fault"

SECOND OIL-FILTERING DATA SET(420)
{FIRST STATE (NORMAL), SECOND STATE (WARNING),
FOURTH STATE (FAULT)}

FIRST SUB-PREDICTION MODEL (NON-OIL FILTERING)(500)

"normal"

FIRST OIL NON-FILTERING DATA SET(510)
{FIRST STATE (NORMAL)}

FIRST SUB-PREDICTION MODEL (NON-OIL FILTERING)(500)

"warning"
"critical"
"fault"

SECOND OIL NON-FILTERING DATA SET(520)
{SECOND STATE (WARNING), THIRD STATE (CRITICAL),
FOURTH STATE (FAULT)}

FIRST PREDICTION MODEL (OIL FILTERING)(600)

SECOND PREDICTION MODEL (NON-OIL FILTERING)(650)

APPARATUS AND METHOD FOR PREDICTING TRANSFORMER STATE IN CONSIDERATION OF WHETHER OIL FILTERING IS PERFORMED

CROSS-REFERENCE TO RELATED APPLICATIONS

The present application claims priority to and the benefit from Korean Patent Application No. 10-2020-0089642, filed Jul. 20, 2020, and Korean Patent Application No. 10-2020-0121939, filed Sep. 22, 2020, each of which are hereby incorporated by reference in their entirety.

BACKGROUND

1. Field of the Invention

The present invention relates to a method of predicting a state of an oil-filled transformer in consideration of whether oil filtering is performed and an apparatus for performing the method. More particularly, the present invention relates to a method of determining whether oil filtering is performed and predicting a state of an oil-filled transformer on the basis of a trained prediction model and an apparatus for performing the method.

2. Discussion of Related Art

With rapid industrial development, the demand for electric energy has drastically increased, leading to an increase in use of power transformers. Accordingly, many currently installed transformers are aged, and unpredictable equipment accidents frequently occur. Since the capacities of power transformers have been increased and power systems have been complicated, an accident caused by an equipment failure involves a widespread power outage, and an economic loss increases due to difficulties in power recovery and supply.

To minimize such a loss, it is required to diagnose a current state of a transformer as accurately as possible. It is necessary to minimize unpredictable accidents of transformers by performing required management and maintenance.

The largest share of cases in transformer accidents is related to the degradation of dielectric strength. The dielectric breakdown of a transformer may involve an explosion due to characteristics thereof. As the most effective method of analyzing insulation degradation characteristics, dissolved gas analysis (DGA) is frequently used. Organic insulating materials, such as insulating oil and insulating paper, used in transformers are increased in temperature due to operation and cause local overheats.

Also, degraded products including various gases are generated through pyrolysis caused by an electric discharge and the like. Gases among the degraded products are dissolved in the insulating oil. For this reason, it is possible to estimate whether there is an abnormality in a transformer by regularly sampling the insulating oil of the transformer in operation and analyzing the concentrations of dissolved gases. However, when a transformer state is simply determined on the basis of the pattern of a specific gas, whether a specific gas exceeds a reference value, etc., it is difficult to make an accurate diagnosis so as to choose management, maintenance, or replacement of the transformer.

Consequently, there is necessity for a method of not only diagnosing the cause of an abnormality in a transformer but also diagnosing a transformer state more clearly than existing methods.

SUMMARY OF THE INVENTION

The present invention is directed to solving all of the above-described problems.

The present invention is also directed to accurately predicting a transformer state on the basis of different learning models depending on whether oil filtering is performed.

The present invention is also directed to accurately predicting a transformer state of a transformer on the basis of learning models separately generated depending on states of a transformer.

Representative configurations of the present invention for achieving the above objects are as follows.

One aspect of the present invention provides a method of predicting a state of a transformer in consideration of whether oil filtering is performed. The method comprises receiving, by a transformer state prediction apparatus, transformer data of a transformer, determining, by the transformer state prediction apparatus, whether an oil of the transformer is filtered on the basis of the transformer data; and predicting, by the transformer state prediction apparatus, a state of the transformer on the basis of different prediction models depending on whether the oil is filtered.

Also, the transformer data includes dissolved gas data of the transformer measured a threshold number of times or more.

Also, the different prediction models include a first prediction model (oil filtering) and a second prediction model (oil non-filtering).

One aspect of the present invention provides an apparatus for predicting a state of a transformer in consideration of whether oil filtering is performed. The apparatus comprises a transformer data input part configured to receive transformer data of a transformer; and a processor operatively connected to the transformer data input part, wherein the processor determines whether an oil of the transformer is filtered on the basis of the transformer data and predicts a state of the transformer on the basis of different prediction models depending on whether the oil is filtered.

Also, the transformer data includes dissolved gas data of the transformer measured a threshold number of times or more.

Also, the different prediction models include a first prediction model (oil filtering) and a second prediction model (oil non-filtering).

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
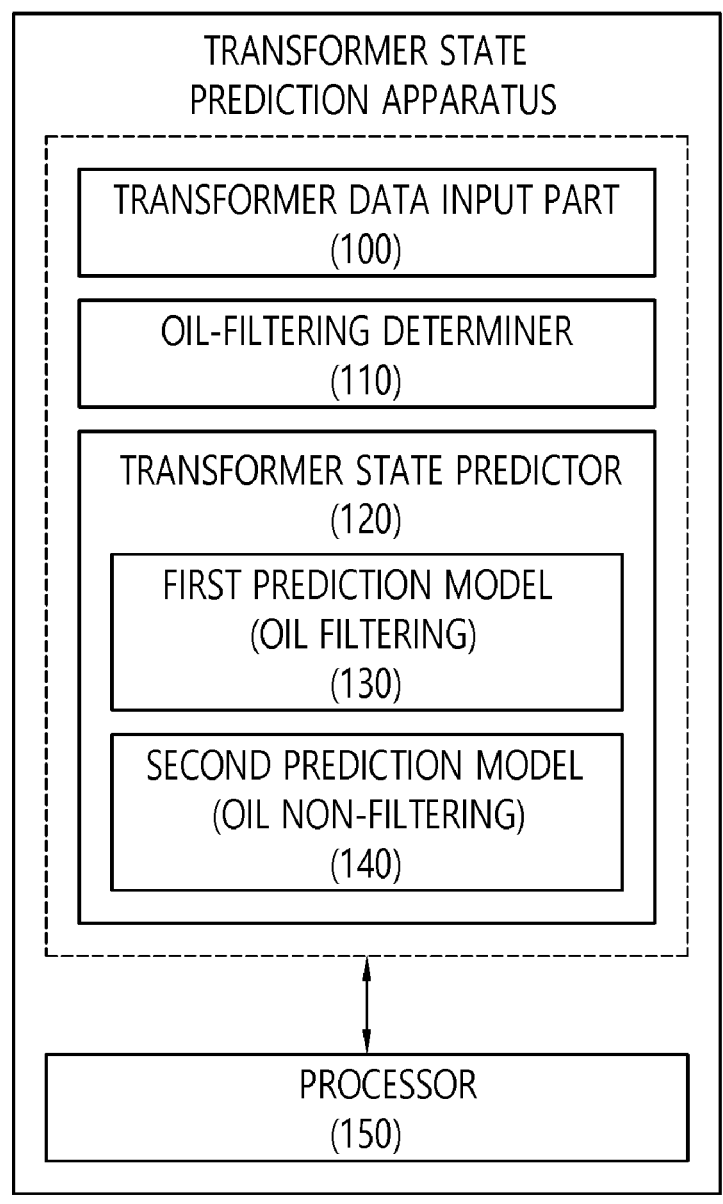
FIG. 1 is a conceptual block diagram of an apparatus for predicting a transformer state according to an exemplary embodiment of the present invention.

Detailed descriptions of the present invention will be made with reference to the accompanying drawings illustrating specific embodiments of the present invention as examples. These embodiments will be described in detail such that the present invention can be performed by those skilled in the art. It should be understood that various embodiments of the present invention are different but are not necessarily mutually exclusive. For example, a specific shape, structure, and characteristic of an embodiment described herein may be implemented in another embodiment without departing from the scope and spirit of the present invention. In addition, it should be understood that a position or an arrangement of each component in each disclosed embodiment may be changed without departing from the scope and spirit of the present invention. Accordingly, there is no intent to limit the present invention to detailed descriptions to be described below. The scope of the present invention is defined by the appended claims and encompasses all equivalents that fall within the scope of the appended claims. Like numbers refer to equal or like functions throughout the description of the figures.

Hereinafter, in order for those skilled in the art to easily perform the present invention, exemplary embodiments of the present invention will be described in detail with reference to the accompanying drawings.

A current state of an existing transformer is determined through periodic oil sampling and dissolved gas analysis (DGA). Specifically, dissolved gas, which is sampled from an oil-filled transformer and analyzed, is compared with a rule-based international standard of Institute of Electrical and Electronic Engineers (IEEE), the International Electrotechnical Commission (IEC), the Electric Technology Research Association (ETRA) of Japan, or the International Council on Large Electric Systems (CIGRE) to diagnose a current state of the transformer.

When an analysis result of a transformer state is determined to be abnormal, physical causes may be additionally diagnosed. Currently, a state of a transformer can be diagnosed through the rule-based international standard, but a state of a transformer cannot be predicted. In other words, it is not possible to predict to which state the transformer will be changed.

Transformer failure causes a large explosion and fire. Accordingly, when a transformer is repaired in advance on the basis of transformer state prediction, many casualties and huge property loss caused by transformer failure may be prevented. Consequently, a method of predicting a transformer state in consideration of whether oil filtering is performed according to an exemplary embodiment of the present invention sets forth a technology for predicting a transformer state on the basis of deep learning and also a method of predicting a transformer state according to whether oil filtering is performed in consideration of a change in transformer state made through oil filtering.

The present invention is intended to predict a transformer state of a subsequent measuring time point on the basis of a dissolved gas. The present invention not only diagnoses a current state of a transformer but also predicts a future state of the transformer. In the present invention, whether oil filtering is performed is determined to predict a state of a transformer, and different state prediction models may be used depending on whether oil filtering is performed.

FIG. 1 is a conceptual block diagram of an apparatus for predicting a transformer state according to an exemplary embodiment of the present invention.

FIG. 1 shows a transformer state prediction apparatus for predicting a transformer state on the basis of a plurality of learning models in consideration of whether oil filtering is performed.

Referring to FIG. 1, the transformer state prediction apparatus may include a transformer data input part 100, an oil-filtering determiner 110, a transformer state predictor 120, and a processor 150.

The transformer data input part 100 may be implemented to receive transformer data for predicting a state of a transformer. The transformer data may include dissolved gas data of the transformer and/or transformer state data. The dissolved gas data may include information on six kinds of dissolved gases measured in the transformer and/or component ratio information of the six kinds of dissolved gases.

The information on the six kinds of dissolved gases may include information on hydrogen ($H_2$), methane ($CH_4$), ethylene ($C_2H_4$), ethane ($C_2H_6$), acetylene ($C_2H_2$), and carbon monoxide (CO), and the component ratio information of the six kinds of dissolved gases may include information on a value of a specific dissolved gas versus the sum of values of the six kinds of dissolved gases.

The transformer state data may include information about which one of a first state (normal), a second state (warning), a third state (critical), and a fourth state (fault) the transformer is in.

In the present invention, n pieces of dissolved gas data measured before a current time point and/or n−1 pieces of transformer state data determined before the current time point may be necessary to predict a transformer state. This will be described below.

The oil-filtering determiner 110 may be implemented to determine whether an oil of the transformer is filtered on the basis of the dissolved gas data. In the present invention, a transformer state is predicted on the basis of different prediction models depending on whether oil filtering is performed, and thus the oil-filtering determiner 110 may determine whether oil filtering is performed.

An oil-filtering task of removing impurities, moisture, gas, etc. of the oil in the entire transformer may be performed as periodic management or may be performed when a specific dissolved gas deviates from a normal range (e.g., a drastic increase). The oil-filtering task may lead to an improvement in insulating performance and a partial improvement in the state of the transformer.

Specifically, when an internal failure occurs in the transformer, heat is generated, and an insulating oil in contact with the heat is pyrolyzed so that gases including hydrogen ($H_2$), methane ($CH_4$), acetylene ($C_2H_2$), ethylene ($C_2H_4$), ethane ($C_2H_6$), etc. are generated. From cellulose insulation paper, methane ($CH_4$), hydrogen ($H_2$), carbon monoxide (CO), carbon dioxide ($CO_2$), etc. are generated. Accordingly, a specific gas is generated depending on a type of internal transformer failure, which may be determined through chromatography analysis of such major gases.

When the oil-filtering task is performed, continuous state degradation of the transformer is stopped in terms of transformer state prediction. In other words, a state prediction result may vary depending on the determination of whether oil filtering is performed in the transformer. When whether oil filtering is performed is not determined, this becomes a major problem in determining the state of the transformer. Accordingly, whether oil filtering is performed in the transformer is determined, and then the state of the transformer may be predicted.

A dissolved gas for determining whether oil filtering is performed may be defined with the term "oil-filtering determination gas." For example, oil-filtering determination gases may be three kinds of dissolved gases (methane ($CH_4$), ethylene ($C_2H_4$), and ethane ($C_2H_6$)). The oil-filtering determiner 110 may determine whether oil filtering is performed by considering a change in the oil-filtering determination gases. When the oil-filtering determination gases, such as three kinds of gases including methane ($CH_4$), ethylene ($C_2H_4$), and ethane ($C_2H_6$), are reduced to a threshold percentage (60%) or less, it may be determined that oil filtering is performed.

In the present invention, a transformer state may be predicted on the basis of prediction models which have been trained with different pieces of training data depending on whether oil filtering is performed.

The transformer state predictor 120 may be implemented to predict a transformer state. The transformer state predictor 120 may include a plurality of prediction models which are separately generated according to whether oil filtering is performed. The transformer state predictor 120 may determine whether oil filtering is performed, select a prediction model, and predict the state of the transformer.

To generate the plurality of prediction models which make a prediction according to whether oil filtering is performed, pieces of training data may be separated according to whether oil filtering is performed on the basis of a change in the oil-filtering determination gases so that training may be performed. For example, the oil-filtering determination gases may be three kinds of dissolved gases (methane $CH_4$, ethylene $C_2H_4$, and ethane $C_2H_6$), and whether oil filtering is performed may be determined on the basis of reduction ratios of the oil-filtering determination gases so that pieces of training data may be separated according to whether oil filtering is performed. The pieces of training data may be classified as training data (oil filtering) for the case of performing the oil-filtering task and training data (oil non-filtering) for the case of not performing the oil-filtering task.

The training data (oil filtering) may be used to train a first prediction model (oil filtering) 130, and the training data (oil non-filtering) may be used to train a second prediction model (oil non-filtering).

As dissolved gas data, the training data may include information on six kinds of dissolved gases and component ratio information of the six kinds of dissolved gases. The information on the six kinds of dissolved gases may include information on hydrogen ($H_2$), methane ($CH_4$), ethylene ($C_2H_4$), ethane ($C_2H_6$), acetylene ($C_2H_2$), and carbon monoxide (CO), and the component ratio information of the six kinds of dissolved gases may include information on a value of a specific dissolved gas versus the sum of values of the six kinds of dissolved gases.

Also, the training data may include transformer state data. The transformer state data may be used for training in combination with dissolved gas data.

The first prediction model (oil filtering) 130 and the second prediction model (oil non-filtering) 140 may be based on a long short-term memory (LSTM) model. The state of the transformer corresponding to a next measuring time point may be predicted on the basis of the dissolved gas data input through the transformer data input part 100. The LSTM model is an example of a model for making a time-series prediction, and a variety of different models may be used. These embodiments may also fall within the scope of the present invention.

Detailed training processes of the first prediction model (oil filtering) 130 and the second prediction model (oil non-filtering) 140 will be described below.

When n pieces of dissolved gas data of previous time points are input to the first prediction model (oil filtering) 130 or the second prediction model (oil non-filtering) 140 in consideration of whether oil filtering is performed, a transformer state of an n+1 time point may be predicted. The state of the transformer may be classified as a first state (normal), a second state (warning), a third state (critical), and a fourth state (fault). Specifically, in the present invention, a subsequent state of a specific transformer may be predicted through the first prediction model (oil filtering) 130 or the second prediction model (oil non-filtering) 140 on the basis of transformer data obtained by measuring the specific transformer n times. The number of measuring times for predicting the transformer state is exemplary and may vary according to the structures of the first prediction model (oil filtering) 130 and the second prediction model (oil non-filtering) 140. Another number of measuring times may be used, and such an embodiment may also fall within the scope of the present invention.

The processor 150 may be implemented to control operation of the transformer data input part 100, the oil-filtering determiner 110, and/or the transformer state predictor 120.

The processor 150 may be operatively connected to the transformer data input part 100, the oil-filtering determiner 110, and/or the transformer state predictor 120.

A method of determining whether oil filtering is performed and predicting a transformer state will be described in detail below according to the exemplary embodiment of the present invention.

Figure 2:
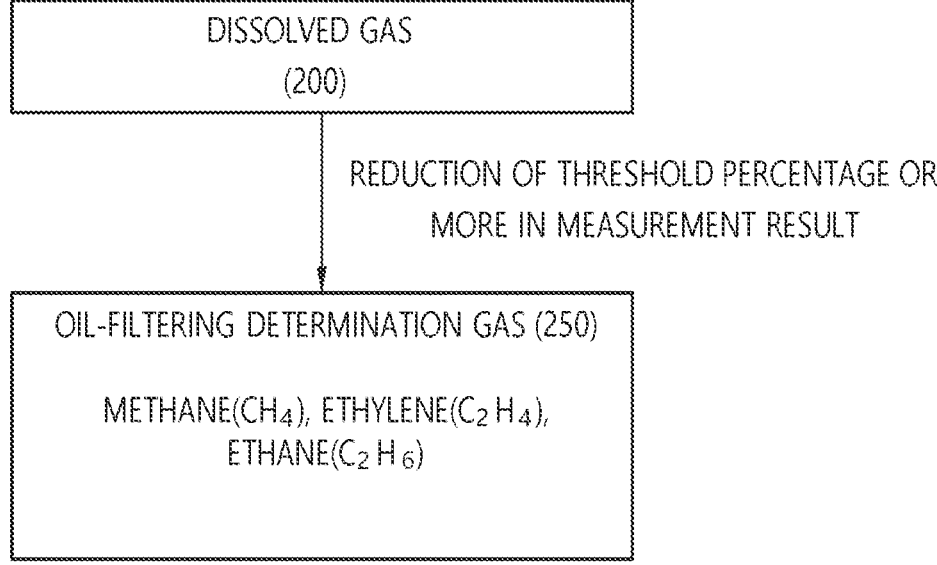
FIG. 2 is a conceptual diagram illustrating a method of determining whether oil filtering is performed according to the exemplary embodiment of the present invention.

FIG. 2 is a conceptual diagram illustrating a method of determining whether oil filtering is performed according to the exemplary embodiment of the present invention.

FIG. 2 shows a method of determining an oil-filtering determination gas for determining whether oil filtering is performed.

Referring to FIG. 2, the oil-filtering determiner may determine whether oil filtering is performed on the basis of an oil-filtering determination gas 250 which may increase accuracy in determining whether oil filtering is performed among six kinds of dissolved gases 200.

Specifically, the oil-filtering determination gas 250 may be a gas which is reduced by a threshold percentage or more as a result of measuring after oil filtering. In the exemplary embodiment of the present invention, it may be determined that oil filtering is performed when three kinds of gases including methane ($CH_4$), ethylene ($C_2H_4$), and ethane ($C_2H_6$) among the six kinds of dissolved gases 200 are simultaneously reduced by the threshold percentage (e.g., 60%) or more at a subsequent measuring time point.

Dissolved gases which may not be selected as the oil-filtering determination gas 250 may be a gas which is lost into the air by the threshold percentage or more during oil sampling, a gas of which a data spread is a threshold value or more, and a gas of which a data variation is a threshold value or less.

In the present invention, among the six kinds of gases, $H_2$ is frequently lost into the air during oil sampling and thus corresponds to a gas of which data accuracy is low. CO corresponds to a gas of which a data spread is too large, and $C_2H_4$ is a gas which is not generated in most cases other than an arc fault. Consequently, $H_2$, CO, and $C_2H_2$ may not be selected as the oil-filtering determination gas 250.

Table 1 below shows data of actual dissolved gases in a transformer in which oil filtering is performed. The data is about the six kinds of dissolved gases in the oil which was filtered in 2015. The unit may be parts per million (ppm).

TABLE 1

| Transformer | Diagnosis Time | $H_2$ | $CH_4$ | $C_2H_4$ | $C_2H_6$ | $C_2H_2$ | CO |
|---|---|---|---|---|---|---|---|
| MTR001 | 2013 | 8 | 0 | 7 | 1 | 5 | 156 |
| | 2015 | 0 | 0 | 10.1 | 4.1 | 8.6 | 226.9 |
| | 2015 | 0 | 0 | 0.7 | 1.3 | 2.2 | 36.2 |
| | 2017 | 5.54 | 0 | 7.14 | 2.19 | 4.4 | 132.24 |
| | 2018 | 5.9 | 0 | 15.8 | 1 | 8.5 | 248.6 |
| | 2019 | 5.3 | 0 | 9.6 | 7.5 | 16.9 | 171.8 |

It is seen that the three kinds of gases including methane ($CH_4$), ethylene ($C_2H_4$), and ethane ($C_2H_6$) are reduced to 60% or less. The three kinds of gases may be used as the oil-filtering determination gas 250 to determine whether oil filtering is performed.

The oil-filtering determination gas 250 is exemplary, and another oil-filtering determination gas 250 may be used to determine whether oil filtering is performed. Such an embodiment may also fall within the scope of the present invention.

Figure 3:
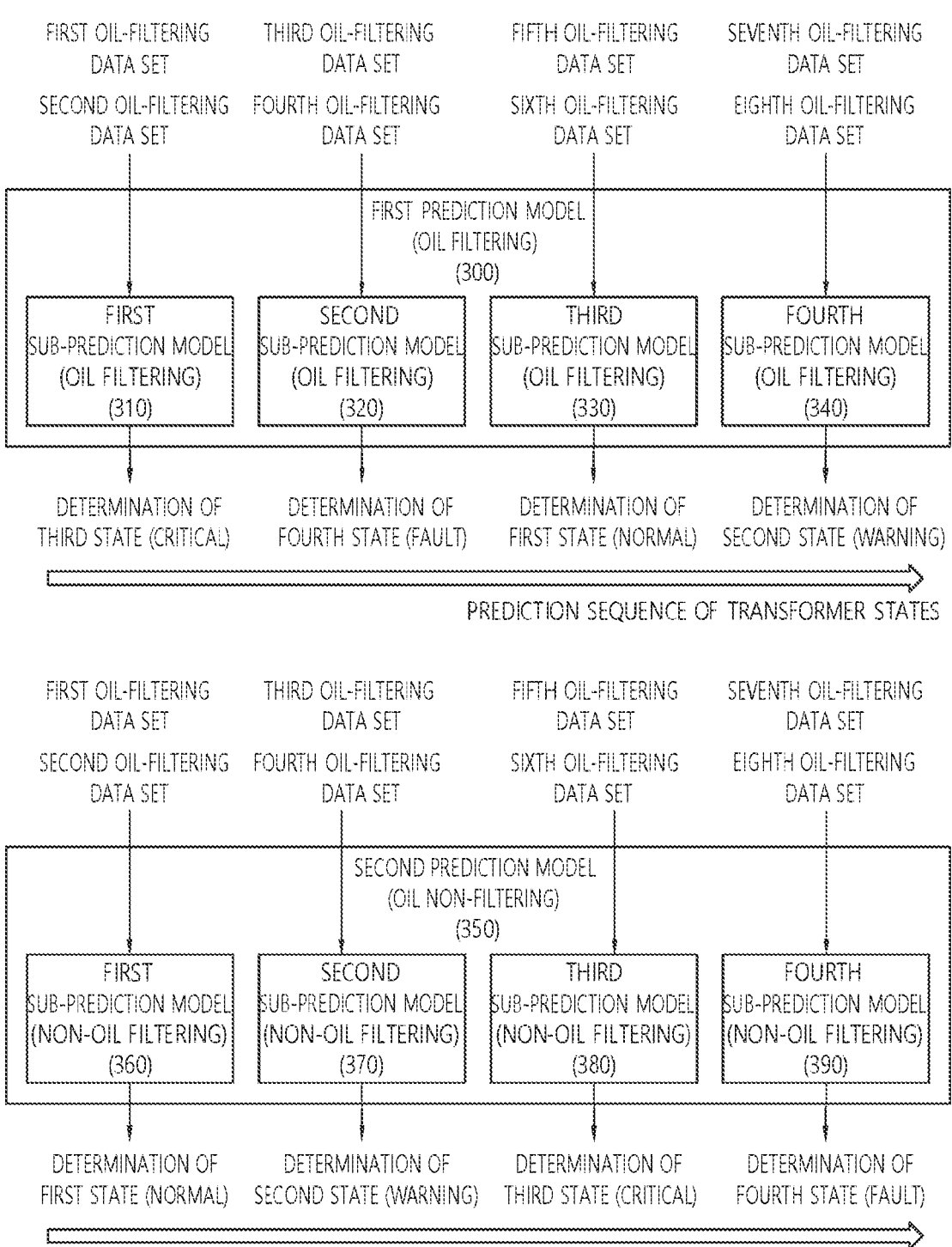
FIG. 3 is a conceptual diagram illustrating a method of predicting a state of a transformer on the basis of machine learning according to the exemplary embodiment of the present invention.

FIG. 3 is a conceptual diagram illustrating a method of predicting a state of a transformer on the basis of machine learning according to the exemplary embodiment of the present invention.

FIG. 3 shows a method of training a prediction model such as an LSTM model.

Referring to FIG. 3, training data may be separately transferred to generate a first prediction model (oil filtering) 300 and a second prediction model (oil non-filtering) 350.

Training data (oil filtering) including dissolved gas data and transformer state data of a case in which oil filtering is performed may be input so that the first prediction model (oil filtering) 300 may be generated. Training data (oil non-filtering) including dissolved gas data and transformer state data of a case in which oil filtering is not performed may be input so that the second prediction model (oil non-filtering) 350 may be generated.

According to the exemplary embodiment of the present invention, each prediction model may include the following sub-prediction models.

First, the first prediction model (oil filtering) 300 may include a plurality of sub-prediction models (e.g., a first sub-prediction model (oil filtering) 310, a second sub-prediction model (oil filtering) 320, a third sub-prediction model (oil filtering) 330, and a fourth sub-prediction model (oil filtering) 340. Each of the plurality of sub-prediction models (oil filtering) may be a prediction model for predicting each individual state of a transformer.

The second prediction model (oil non-filtering) 350 may include a plurality of sub-prediction models (e.g., a first sub-prediction model (oil non-filtering) 360, a second sub-prediction model (oil non-filtering) 370, a third sub-prediction model (oil non-filtering) 380, and a fourth sub-prediction model (oil non-filtering) 390. Each of the plurality of sub-prediction models (oil non-filtering) may be a prediction model for predicting each individual state of a transformer.

In the case of determining one of the four states of a transformer, the first to third sub-prediction models (oil filtering) 310 to 330 or the first to third sub-prediction models (oil non-filtering) 360 to 380 may be used, and the fourth sub-prediction model (oil filtering) 340 or the fourth sub-prediction model (oil non-filtering) 390 may not be included in the prediction models. The reason is that when a state of a transformer is not predicted on the basis of the third sub-prediction model (oil filtering) 330 or the third sub-prediction model (oil non-filtering) 380, the last transformer state on which a determination will be made is predicted as a subsequent transformer state without the fourth sub-prediction model (oil filtering) 340 or the fourth sub-prediction model (oil non-filtering) 390. In the exemplary embodiment of the present invention, it is assumed for convenience of description that the fourth sub-prediction model (oil filtering) 340 or the fourth sub-prediction model (oil non-filtering) 390 are present.

It may be assumed that transformer states are classified as the first state (normal), the second state (warning), the third state (critical), and the fourth state (fault).

Each sub-prediction model may be generated through individual training and used to predict a state of each transformer.

A method of training the sub-prediction models included in the first prediction model (oil filtering) 300 or the second prediction model (oil non-filtering) 350 will be described below with reference to FIGS. 4 and 5. A transformer state determined by each individual sub-prediction model is exemplary and may vary.

Specifically, a sequence, in which the individual sub-prediction models included in each of the first prediction model (oil filtering) 300 and the second prediction model (oil non-filtering) 350 are arranged to sequentially determine a transformer state, may vary. For example, a sequence in which the first sub-prediction model (oil filtering) 310 to the fourth sub-prediction model (oil filtering) 340 included in the first prediction model (oil filtering) 300 are arranged may be adaptively changed in consideration of prediction accuracy. Likewise, a sequence in which the first sub-prediction model (oil non-filtering) 360 to the fourth sub-prediction model (oil non-filtering) 390 included in the second prediction model (oil non-filtering) 350 are arranged may be adaptively changed.

Figure 4:
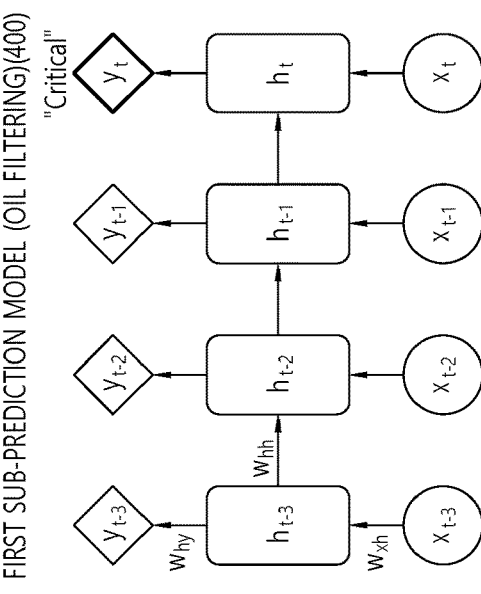
FIG. 4 is a conceptual diagram illustrating a method of generating a first prediction model (oil filtering) according to an exemplary embodiment of the present invention.
Figure 4:
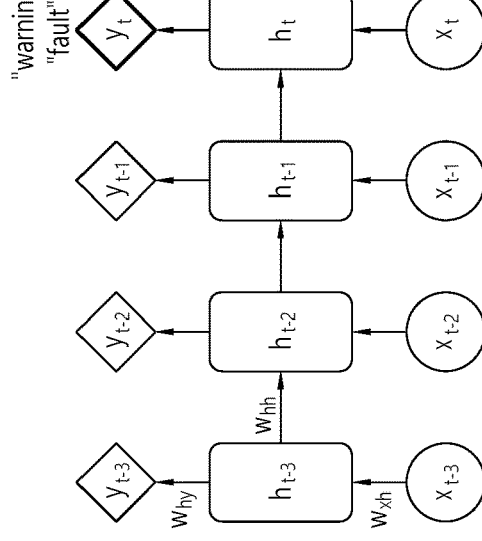

FIG. 4 is a conceptual diagram illustrating a method of generating a first prediction model (oil filtering) according to an exemplary embodiment of the present invention.

FIG. 4 shows a method of generating a plurality of sub-prediction models included in the first prediction model (oil filtering). The number of sub-prediction models may be exemplary.

Referring to FIG. 4, the plurality of sub-prediction models may include a first sub-prediction model (oil filtering), a second sub-prediction model (oil filtering), a third sub-prediction model (oil filtering), and a fourth sub-prediction model (oil filtering). Each of the sub-prediction models (oil filtering) may be a model which is individually trained to distinguish one state from other states. Each of the plurality of sub-prediction models may be an LSTM model which performs predictions in time series.

The first sub-prediction model (oil filtering) 400 may be a model for distinguishing the third state (critical) from others, the first state (normal), the second state (warning), and the fourth state (fault). To train the first sub-prediction model (oil filtering) 400, a first oil-filtering data set 410 and a second oil-filtering data set 420 may be input as training data. Specifically, the first oil-filtering data set 410 may include dissolved gas data and transformer state data with which a transformer is determined to be in the third state (critical), and the second oil-filtering data set 420 may include dissolved gas data and transformer state data with which a transformer is determined to be in the first state (normal), the second state (warning), or the fourth state (fault). The first oil-filtering data set 410 and the second oil-filtering data set 420 may include dissolved gas data and transformer state data of a case in which oil filtering is performed.

Specifically, the first oil-filtering data set 410 may be annual dissolved gas data of a transformer, which is determined to be in the third state (critical) in the fifth year, during a period from the first year to the fourth year and annual transformer state data of the transformer during a period from the second year to the fifth year. The second oil-filtering data set 420 may be annual dissolved gas data of a transformer, which is determined to be in the first state (normal), the second state (warning), or the fourth state (fault) in the fifth year, during a period from the first year to the fourth year and annual transformer state data of the transformer during a period from the second year to the fifth year.

The training data may include results of collecting information on the six kinds of dissolved gases and component ratio information of the six kinds of dissolved gases n times and results of making a diagnosis n times, and n layers may be trained on the basis of the training data.

Dissolved gas data of a specific year is input to each of the n layers as an input value, and transformer state data of the subsequent year is input as an output value so that the n layers may be modeled.

The first oil-filtering data set 410 and the second oil-filtering data set 420, which are separately labeled and correspond to the case in which oil filtering is performed, may be input to the first sub-prediction model (oil filtering) 400.

As a detailed example, {training data of the year 2013, training data of the year 2014, training data of the year 2015, training data of the year 2016, training data of the year 2017} included in the first oil-filtering data set 410 may be labeled with first information and input to the first sub-prediction model (oil filtering) 400. The training data may include annual dissolved gas data and annual transformer state data of a transformer which is determined to be in the third state (critical) in 2017.

Dissolved gas data of the year 2013 may be input to $x_{t-3}$, transformer state data of the year 2014 may be input to $y_{t-3}$, dissolved gas data of the year 2014 may be input to $x_{t-2}$, transformer state data of the year 2015 may be input to $y_{t-2}$, dissolved gas data of the year 2015 may be input to $x_{t-1}$, transformer state data of the year 2016 may be input to $y_{t-1}$, dissolved gas data of the year 2016 may be input to $x_t$, and transformer state data of the year 2017 may be input to $y_t$. In the first oil-filtering data set 410, the transformer state data of the year 2017 in $y_t$ may be the third state (critical).

Likewise, {training data of the year 2013, training data of the year 2014, training data of the year 2015, training data of the year 2016, training data of the year 2017} included in the second oil-filtering data set 420 may be labeled with second information and input to the first sub-prediction model (oil filtering) 400. The training data may include annual dissolved gas data and annual transformer state data of a transformer which is determined to be in the first state (normal), the second state (warning), or the fourth state (fault) in 2017.

Dissolved gas data of the year 2013 may be input to $x_{t-3}$, transformer state data of the year 2014 may be input to $y_{t-3}$, dissolved gas data of the year 2014 may be input to $x_{t-2}$, transformer state data of the year 2015 may be input to $y_{t-2}$, dissolved gas data of the year 2015 may be input to $x_{t-1}$, transformer state data of the year 2016 may be input to $y_{t-1}$, dissolved gas data of the year 2016 may be input to $x_t$, and transformer state data of the year 2017 may be input to $y_t$. In the second oil-filtering data set 420, the transformer state data of the year 2017 in $y_t$ may be the first state (normal), the second state (warning), or the fourth state (fault).

In this way, the first sub-prediction model (oil filtering) 400 may learn weights for distinguishing the third state (critical) from the other states on the basis of the first oil-filtering data set 410 labeled with the first information and the second oil-filtering data set 420 labeled with the second information.

Likewise, the second sub-prediction model (oil filtering) may learn weights for distinguishing the fourth state (fault) from the other states (the first state (normal), the second state (warning), and the third state (critical)) on the basis of a third oil-filtering data set labeled with the first information and a fourth oil-filtering data set labeled with the second information.

The third sub-prediction model (oil filtering) may learn weights for distinguishing the first state (normal) from the other states (the second state (warning), the third state (critical), and the fourth state (fault)) on the basis of a fifth oil-filtering data set labeled with the first information and a sixth oil-filtering data set labeled with the second information.

The fourth sub-prediction model (oil filtering) may learn weights for distinguishing the second state (warning) from the other states (the first state (normal), the third state (critical), and the fourth state (fault)) on the basis of a seventh oil-filtering data set labeled with the first information and an eighth oil-filtering data set labeled with the second information.

As described above, an arrangement sequence of sub-prediction models may be set differently in a prediction model depending on accuracy in determination, and such an embodiment may also fall within the scope of the present invention.

Figure 5:
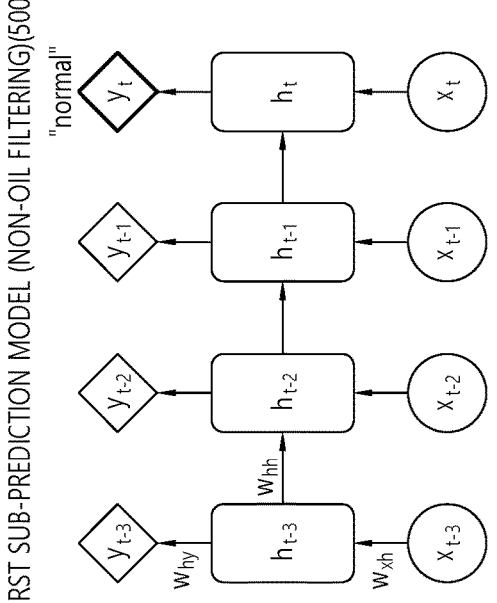
FIG. 5 is a conceptual diagram illustrating a method of generating a second prediction model (oil non-filtering) according to an exemplary embodiment of the present invention.
Figure 5:
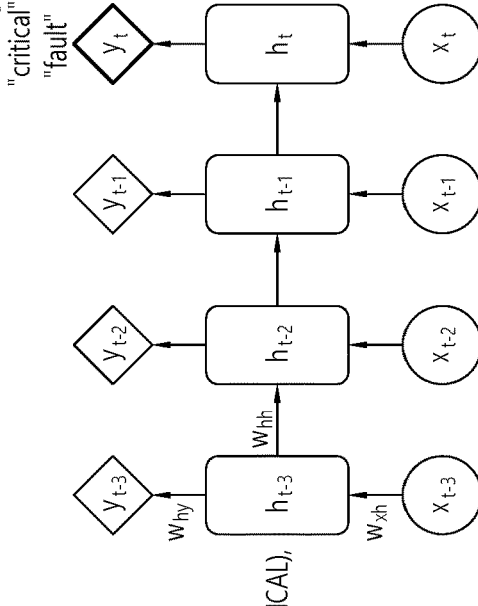

FIG. 5 is a conceptual diagram illustrating a method of generating a second prediction model (oil non-filtering) according to an exemplary embodiment of the present invention.

FIG. 5 shows a method of generating a plurality of sub-prediction models included in the second prediction model (oil non-filtering). The number of sub-prediction models may be exemplary.

Referring to FIG. 5, the plurality of sub-prediction models may include a first sub-prediction model (oil non-filtering), a second sub-prediction model (oil non-filtering), a third sub-prediction model (oil non-filtering), and a fourth sub-prediction model (oil non-filtering). Each of the sub-prediction models (oil non-filtering) may be a model which is individually trained to distinguish one state from other states. Each of the plurality of sub-prediction models may be an LSTM model which performs predictions in time series.

The first sub-prediction model (oil non-filtering) 500 may be a model for distinguishing the first state (normal) from others, the second state (warning), the third state (critical), and the fourth state (fault). To train the first sub-prediction model (oil non-filtering) 500, a first oil non-filtering data set 510 and a second oil non-filtering data set 520 may be input as training data. Specifically, the first oil non-filtering data set 510 may include dissolved gas data and transformer state data with which a transformer is determined to be in the first state (normal), and the second oil non-filtering data set 520 may include dissolved gas data and transformer state data with which a transformer is determined to be in the second state, the third state, or the fourth state. The first oil non-filtering data set 510 and the second oil non-filtering data set 520 may include dissolved gas data and transformer state data of a case in which oil filtering is not performed.

Specifically, the first oil non-filtering data set 510 may be annual dissolved gas data of a transformer, which is determined to be in the first state (normal) in the fifth year, during a period from the first year to the fourth year and annual transformer state data of the transformer during a period from the second year to the fifth year. The second oil non-filtering data set 520 may be annual dissolved gas data of a period from the first year to the fourth year of a transformer, which is determined to be in the second state (warning), the third state (critical), or the fourth state (fault) in the fifth year, and annual transformer state data of the transformer during a period from the second year to the fifth year.

The training data may include results of collecting information on the six kinds of dissolved gases and component ratio information of the six kinds of dissolved gases n times and results of making a diagnosis n times, and n layers may be trained on the basis of the training data. Dissolved gas data of a specific year is input to each of the n layers as an input value, and transformer state data of the subsequent year is input as an output value so that the n layers may be modeled.

The first oil non-filtering data set 510 and the second oil non-filtering data set 520 which are separately labeled and correspond to the case in which oil filtering is not performed may be input to the first sub-prediction model (oil non-filtering) 500.

As a detailed example, {training data of the year 2013, training data of the year 2014, training data of the year 2015, training data of the year 2016, training data of the year 2017} included in the first oil non-filtering data set 510 may be labeled with first information and input to the first sub-prediction model (oil non-filtering) 500. The training data may include annual dissolved gas data and annual transformer state data of a transformer which is determined to be in the first state (normal) in 2017.

Dissolved gas data of the year 2013 may be input to $x_{t-3}$, transformer state data of the year 2014 may be input to $y_{t-3}$, dissolved gas data of the year 2014 may be input to $x_{t-2}$, transformer state data of the year 2015 may be input to $y_{t-2}$, dissolved gas data of the year 2015 may be input to $x_{t-1}$, transformer state data of the year 2016 may be input to $y_{t-1}$, dissolved gas data of the year 2016 may be input to $x_t$, and transformer state data of the year 2017 may be input to $y_t$. In the first oil non-filtering data set 510, the transformer state data of the year 2017 in $y_t$ may be the first state (normal).

Likewise, {training data of the year 2013, training data of the year 2014, training data of the year 2015, training data of the year 2016, training data of the year 2017} included in the second oil non-filtering data set 520 may be labeled with second information and input to the first sub-prediction model (oil non-filtering) 500. The training data may include annual dissolved gas data and annual transformer state data of a transformer which is determined to be in the second state (warning), the third state (critical), or the fourth state (fault) in 2017.

Dissolved gas data of the year 2013 may be input to $x_{t-3}$, transformer state data of the year 2014 may be input to $y_{t-3}$, dissolved gas data of the year 2014 may be input to $x_{t-2}$, transformer state data of the year 2015 may be input to $y_{t-2}$, dissolved gas data of the year 2015 may be input to $x_{t-1}$, transformer state data of the year 2016 may be input to $y_{t-1}$, dissolved gas data of the year 2016 may be input to $x_t$, and transformer state data of the year 2017 may be input to $y_t$. In the second oil non-filtering data set 520, the transformer state data of the year 2017 in $y_t$ may be the second state (warning), the third state (critical), or the fourth state (fault).

In this way, the first sub-prediction model (oil non-filtering) 500 may learn weights for distinguishing the first state (normal) from the other states on the basis of the first oil non-filtering data set 510 labeled with the first information and the second oil non-filtering data set 520 labeled with the second information.

Likewise, the second sub-prediction model (oil non-filtering) may learn weights for distinguishing the second state (warning) from the other states (the first state (normal), the third state (critical), and the fourth state (fault)) on the basis of a third oil non-filtering data set labeled with the first information and a fourth oil non-filtering data set labeled with the second information.

The third sub-prediction model (oil non-filtering) may learn weights for distinguishing the third state (critical) from the other states (the first state (normal), the second state (warning), and the fourth state (fault)) on the basis of a fifth oil non-filtering data set labeled with the first information and a sixth on-oil-filtering data set labeled with the second information.

The fourth sub-prediction model (oil non-filtering) may learn weights for distinguishing the fourth state (fault) from the other states (the first state (normal), the second state (warning), and the third state (critical)) on the basis of a seventh oil non-filtering data set labeled with the first information and an eighth oil non-filtering data set labeled with the second information.

As described above, an arrangement sequence of sub-prediction models may be set differently in a prediction model depending on accuracy in determination, and such an embodiment may also fall within the scope of the present invention.

FIGS. 3 to 5 show sub-prediction models which are included in a first prediction model or a second prediction model to predict each individual state. However, according to an exemplary embodiment of the present invention, a first prediction model (oil filtering) and a second prediction model (oil non-filtering) may be separately generated without sub-prediction models.

Figure 6:
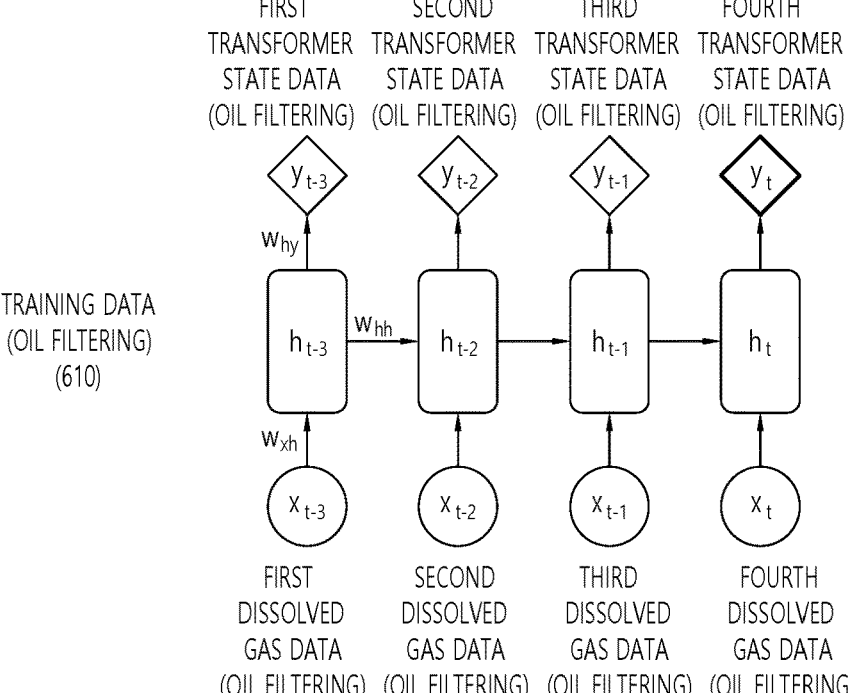
FIG. 6 is a conceptual diagram illustrating a method of generating a prediction model according to the exemplary embodiment of the present invention.
Figure 6:
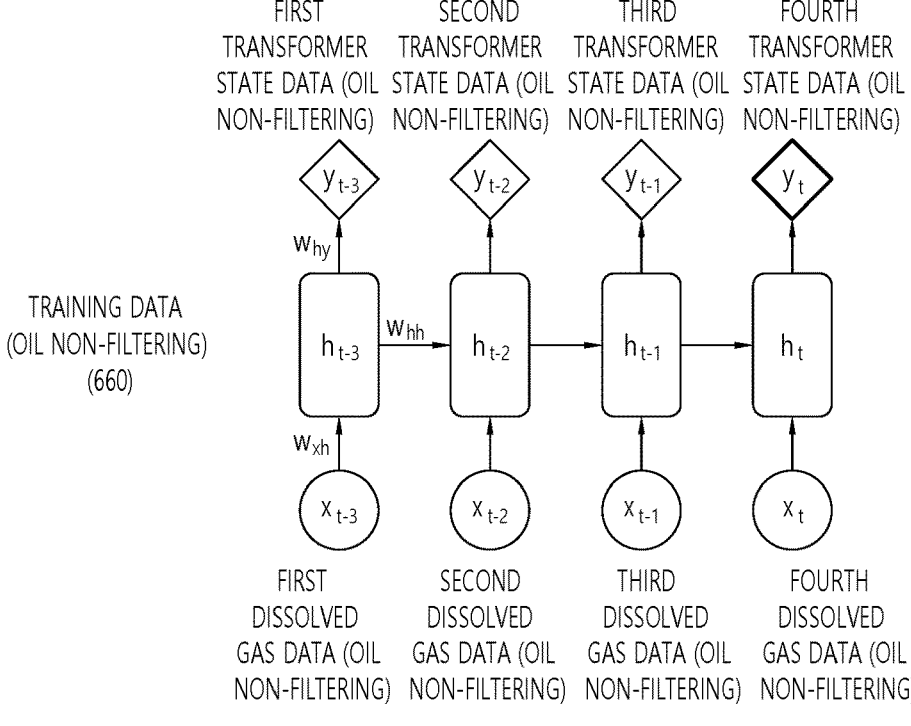

FIG. 6 is a conceptual diagram illustrating a method of generating a prediction model according to the exemplary embodiment of the present invention.

FIG. 6 shows a method of generating a first prediction model (oil filtering) and a second prediction model (oil non-filtering) without generating sub-prediction models.

Referring to FIG. 6, a first prediction model (oil filtering) 600 may be obtained on the basis of training data (oil filtering) 610 of a case in which oil filtering is performed. The first prediction model (oil filtering) 600 may include a first layer (oil filtering), a second layer (oil filtering), a third layer (oil filtering), and a fourth layer (oil filtering).

1. To the first layer (oil filtering), first dissolved gas data (oil filtering) of a transformer corresponding to the year t−3 may be input as an input value, and first transformer state data (oil filtering) corresponding to up to the year t−2 may be input as an output value.

2. To the second layer (oil filtering), second dissolved gas data (oil filtering) of the transformer corresponding to the year t−2 may be input as an input value, and second transformer state data (oil filtering) corresponding to up to the year t−1 may be input as an output value.

3. To the third layer (oil filtering), third dissolved gas data (oil filtering) of the transformer corresponding to the year t−1 may be input as an input value, and third transformer state data (oil filtering) corresponding to up to the year t may be input as an output value.

4. To the fourth layer (oil filtering), fourth dissolved gas data (oil filtering) of the transformer corresponding to the year t may be input as an input value, and fourth transformer state data (oil filtering) corresponding to up to the year t+1 may be input as an output value.

In this way, the four pieces of sequential dissolved gas data and the four pieces of transformer state data are input as training data so that the first layer (oil filtering), the second layer (oil filtering), the third layer (oil filtering), and the fourth layer (oil filtering) may be trained.

Likewise, a second prediction model (oil non-filtering) 650 may be obtained on the basis of training data (oil non-filtering) 660 of a case in which oil filtering is not performed. The second prediction model (oil filtering) 650 may include a first layer (oil non-filtering), a second layer (oil non-filtering), a third layer (oil non-filtering), and a fourth layer (oil non-filtering).

1. To the first layer (oil non-filtering), first dissolved gas data (oil non-filtering) of a transformer corresponding to the year t−3 may be input as an input value, and first transformer state data (oil non-filtering) corresponding to up to the year t−2 may be input as an output value.

2. To the second layer (oil non-filtering), second dissolved gas data (oil non-filtering) of the transformer corresponding to the year t−2 may be input as an input value, and second transformer state data (oil non-filtering) corresponding to up to the year t−1 may be input as an output value.

3. To the third layer (oil non-filtering), third dissolved gas data (oil non-filtering) of the transformer corresponding to the year t−1 may be input as an input value, and third transformer state data (oil non-filtering) corresponding to up to the year t may be input as an output value.

4. To the fourth layer (oil non-filtering), fourth dissolved gas data (oil non-filtering) of the transformer corresponding to the year t may be input as an input value, and fourth transformer state data (oil non-filtering) corresponding to up to the year t+1 may be input as an output value.

In this way, the four pieces of sequential dissolved gas data and the four pieces of transformer state data are input as training data so that the first layer (oil non-filtering), the second layer (oil non-filtering), the third layer (oil non-filtering), and the fourth layer (oil non-filtering) may be trained.

In other words, in this way, a prediction model may be generated without a sub-prediction model for determining each individual transformer state, and such an embodiment also falls within the scope of the present invention. Alternatively, sub-prediction models may be used to determine only some of the transformer states, and other states may be determined by an integrated determination model as shown in FIG. 6. Such an embodiment may also fall within the scope of the present invention.

Figure 7:
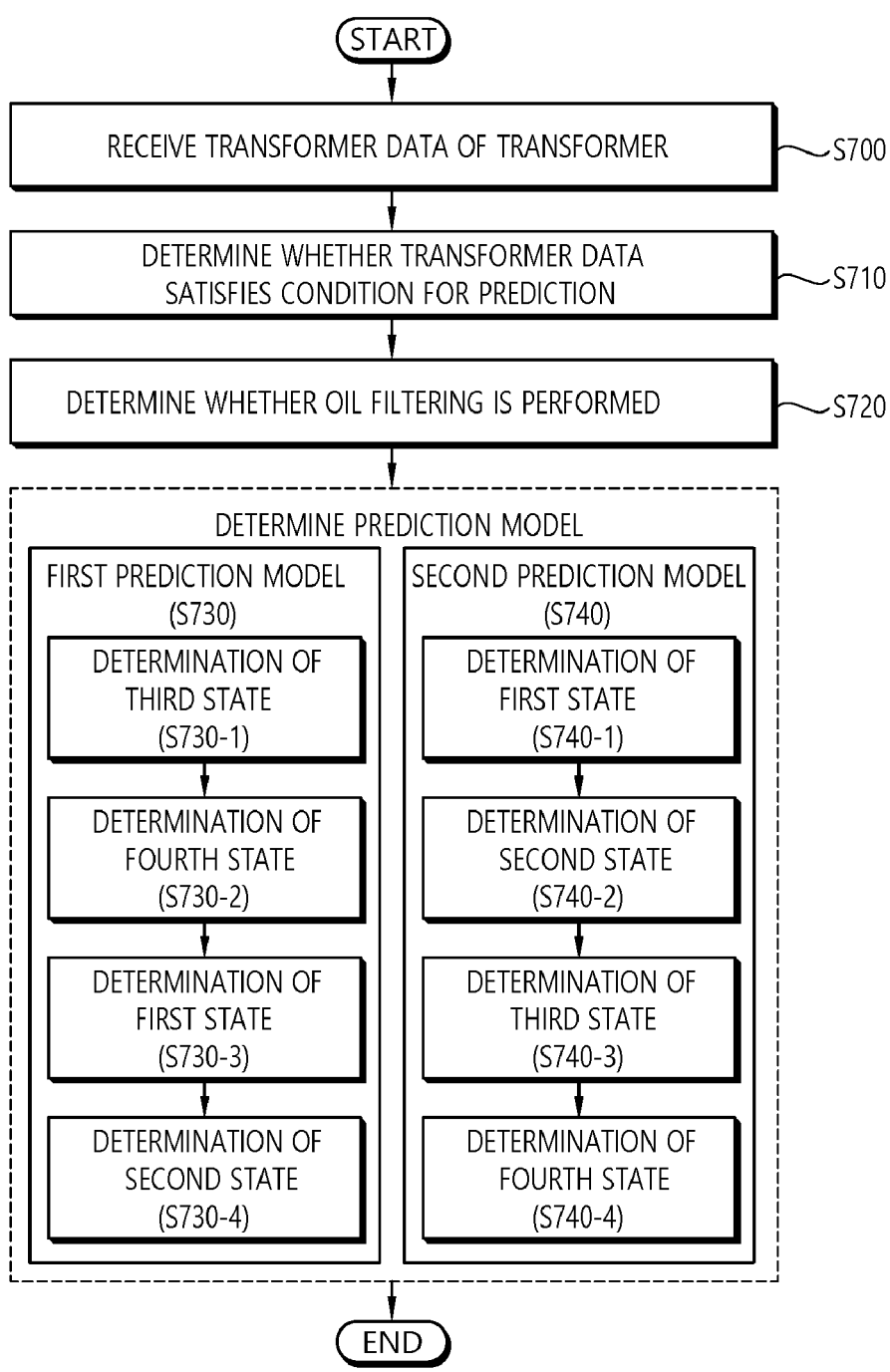
FIG. 7 is a flowchart illustrating a method of predicting a transformer state according to the exemplary embodiment of the present invention.

FIG. 7 is a flowchart illustrating a method of predicting a transformer state according to the exemplary embodiment of the present invention.

FIG. 7 shows a sequence of predicting a transformer state.

Referring to FIG. 7, transformer data of a transformer is received (operation S700).

The transformer data may include dissolved gas data of the transformer and/or transformer state data. The dissolved gas data may include information on the six kinds of dissolved gases measured in the transformer and/or component ratio information of the six kinds of dissolved gases.

It is determined whether the transformer data satisfies a condition for prediction (operation S710).

For example, the continuity of the dissolved gas data and/or the transformer state data included in the transformer data and whether the number of pieces of dissolved gas data and transformer state data is a threshold value or more may be determined to predict a transformer state in the present invention.

Specifically, it may be determined whether there are n pieces of consecutive dissolved gas data and/or (n−1) pieces of transformer state data corresponding to n pieces of consecutive dissolved gas data in time series.

When the transformer data does not satisfy the condition for prediction, transformer state prediction may be terminated.

On the other hand, when the transformer data satisfies the condition for prediction, it is determined whether oil filtering is performed (operation S720).

In the present invention, different prediction models are applied depending on whether oil filtering is performed, and thus whether oil filtering is performed may be determined to decide a prediction model to be applied.

When oil filtering is performed, a transformer state is predicted on the basis of a first prediction model (oil filtering) (operation S730), and when oil filtering is not performed, a transformer state is predicted on the basis of a second prediction model (oil non-filtering) (operation S740).

When a determination is made on the basis of sub-prediction models as described above with reference to FIGS. 3 to 5, a state may be determined in different operation sequences as described below.

When oil filtering is performed (operation S730), a transformer state may be determined in the following operation sequence.

1. Whether a transformer state is the third state (critical) may be determined on the basis of a first sub-prediction model (oil filtering) (operation S730-1).

2. Whether a transformer state is the fourth state (fault) may be determined on the basis of a second sub-prediction model (oil filtering) (operation S730-2).

3. Whether a transformer state is the first state (normal) may be determined on the basis of a third sub-prediction model (oil filtering) (operation S730-3).

4. Whether a transformer state is the second state (warning) may be determined on the basis of a fourth sub-prediction model (oil filtering) (operation S730-4).

When oil filtering is not performed (operation S740), a transformer state may be determined in the following operation sequence.

1. Whether a transformer state is the first state (normal) may be determined on the basis of a first sub-prediction model (oil non-filtering) (operation S740-1).

2. Whether a transformer state is the second state (warning) may be determined on the basis of a second sub-prediction model (oil non-filtering) (operation S740-2).

3. Whether a transformer state is the third state (critical) may be determined on the basis of a third sub-prediction model (oil non-filtering) (operation S740-3).

4. Whether a transformer state is the fourth state (fault) may be determined on the basis of a fourth sub-prediction model (oil non-filtering) (operation S740-4).

As described above, a transformer state may be determined in different operation sequences in consideration of prediction accuracy depending on whether oil filtering is performed.

The above-described embodiments of the present invention may be implemented as the form of a computer instruction that can be executed through various computer components and may be recorded in computer readable recording media. The computer readable recording media may include a program instruction, a data file, and a data structure, and/or combinations thereof. The program instruction recorded in the computer readable recording media may be specially designed and prepared for the present invention or may be an available well-known instruction for those skilled in the field of computer software.

Examples of the computer readable recording media include, for example, magnetic media such as a hard disk, a floppy disk, and a magnetic tape, optical media such as a compact disc read only memory (CD-ROM) and a digital video disc (DVD), magneto-optical media such as a floptical disk, and a hardware device, such as a read only memory (ROM), a random access memory (RAM), or a flash memory, that is specially made to store and perform the program instruction. Examples of the program instruction may include a machine code generated by a compiler and a high-level language code that can be executed in a computer using an interpreter. Such a hardware device may be configured as at least one software module in order to perform operations of the present invention and vice versa.

While the present invention has been described with reference to specific details such as detailed components, specific embodiments and drawings, these are only examples to facilitate overall understanding of the present invention and the present invention is not limited thereto. It will be understood by those skilled in the art that various modifications and alterations may be made.

Therefore, the spirit and scope of the present invention are defined not by the detailed description of the present invention but by the appended claims and encompass all modifications and equivalents that fall within the scope of the appended claims.

What is claimed is:

1. A method of predicting a state of a power transformer, based on machine learning, in consideration of whether oil filtering of the power transformer is performed, the method comprising:

generating prediction models including an oil filtering prediction model and an oil non-filtering prediction model, the oil filtering and oil non-filtering prediction models being long short term models, the oil filtering and oil non-filtering prediction models each including a plurality of sub-prediction models, the prediction models generated via:

receiving, by a transformer data input receiver of a transformer state prediction apparatus, transformer training data of a transformer, the transformer training data including dissolved gas data of the transformer measured at n previous time points, n being greater than or equal to a threshold number of times for predicting the state of the transformer, separating the transformer training data into pieces of training data based on a determination, by a processor of the transformer state prediction apparatus, whether oil of the transformer has been filtered on the basis of the transformer training data, the pieces of training data including oil filtering training data and oil non-filtering training data, training the oil filtering prediction model with the oil filtering training data including dissolved gas data and transformer state data of a case in which oil filtering has been performed, the oil filtering prediction model trained to predict a transformer state of the transformer in the case in which oil filtering has been performed for the transformer, training the oil non-filtering prediction model with the oil non-filtering training data including dissolved gas data and transformer state data of a case in which oil filtering has not been performed, the oil non-filtering prediction model trained to predict a transformer state of the transformer in the case in which oil filtering has not been performed for the transformer, and training each sub-prediction model individually to distinguish transformer states and learn weights for distinguishing the transformer states, the transformer states including a normal state, a warning state, a critical state, and a fault state, wherein the oil filtering prediction model includes a first layer to which first dissolved gas data corresponding to year t−3 is input as an input value and first transformer state data corresponding up to year t−2 is input as an output value, a second layer to which second dissolved gas data corresponding to the year t−2 is input as an input value and second transformer state data corresponding up to year t−1 is input as an output value, a third layer to which third dissolved gas data corresponding to the year t−1 is input as an input value and the third transformer state data corresponding up to year t is input as an output value, and a fourth layer to which fourth dissolved gas data corresponding to the year t is input as an input value and fourth transformer state data corresponding up to year t+1 is input as an output value, and wherein the oil non-filtering prediction model includes a first layer to which first dissolved gas data corresponding to year t−3 is input as an input value and first transformer state data corresponding up to year t−2 is input as an output value, a second layer to which second dissolved gas data corresponding to the year t−2 is input as an input value and second transformer state data corresponding up to year t−1 is input as an output value, a third layer to which third dissolved gas data corresponding to the year t−1 is input as an input value and the third transformer state data corresponding up to year t is input as an output value, and a fourth layer to which fourth dissolved gas data corresponding to the year t is input as an input value and fourth transformer state data corresponding up to year t+1 is input as an output value; and generating a prediction, by the processor of the transformer state prediction apparatus, of the transformer state at an n+1 time point on the basis of the determination and the prediction models via:

receiving, by the transformer data input receiver of the transformer state prediction apparatus, transformer data of the transformer comprising dissolved gas data of n previous time points, determining, by the processor of the transformer state prediction apparatus, an oil filtering determination of whether oil of the transformer has been filtered on the basis of the transformer data, determining a selected model of the prediction models to make the prediction based on the oil filtering determination by:

selecting the oil filtering prediction model as the selected model responsive to the oil filtering determination indicating oil filtering has been performed for the transformer, and selecting the oil non-filtering prediction model as the selected model responsive to the oil filtering determination indicating oil filtering has not been performed for the transformer, and providing the dissolved gas data of n previous time points as input to the selected model to generate the prediction of the transformer state at the n+1 time point.

2. The method of claim 1, wherein whether the oil filtering has been performed is determined based on reduction ratios of oil-filtering determination gases.

3. The method of claim 1, wherein the transformer training data include information on six kinds of dissolved gases and component ratio information of the six kinds of dissolved gases, the six kinds of dissolved gases including hydrogen ($H_2$), methane (CH4), ethylene ($C_2H_4$), ethane ($C_2H_6$), acetylene (C,H,), and carbon monoxide (CO), the component ratio information including information on a value of a specific dissolved gas versus the sum of values of the six kinds of dissolved gases.

4. The method of claim 2, wherein the oil-filtering determination gases comprise methane ($CH_4$), ethylene ($C_2H_4$) and ethane ($C_2H_6$), and wherein it is determined that the oil filtering has been performed when the oil-filtering determination gases are simultaneously reduced by a threshold percentage or more at a subsequent measuring time point and wherein $H_2$, CO and $C_2H_2$ are not selected as the oil-filtering determination gas.

5. The method of claim 1, wherein a first sub-prediction model is a model for distinguishing the normal state from the warning state, the critical state and the fault state of the transformer, wherein a second sub-prediction model is a model for distinguishing the warning state from the normal state, the critical state and the fault state of the transformer, the third sub-prediction model is a model for distinguishing the critical state from the normal state, the warning state and the fault state of the transformer, and wherein the fourth sub-prediction model is a model for distinguishing the fault state from the normal state, the warning state and the critical state of the transformer.

6. The method of claim 1, wherein a first sub-prediction model of the oil filtering prediction model is a model for distinguishing the critical state from the normal state, the warning state and the fault state of the transformer and the first sub-prediction model is trained based on a first oil-filtering data set including dissolved gas data and transformer state data with which the transformer is determined to be in the critical state, and a second oil-filtering data set including dissolved gas data and transformer state data with which the transformer is determined to be in the normal state, the warning state or the fault state, the first oil-filtering data set and the second oil-filtering data set each including dissolved gas data and transformer state data of a case in which the oil filter has been performed.

7. The method of claim 6, wherein a second sub-prediction model of the oil filtering prediction model is a model for distinguishing the fault state from the normal state, the warning state and the critical state of the transformer based on a third oil-filtering data set labeled as the first information and a fourth oil-filtering data set labeled as the second information, wherein a third sub-prediction model of the oil filtering prediction model is a model for distinguishing the normal state from the warning state, the critical state and the fault state based on a fifth oil-filtering data set labeled with the first information and a sixth oil-filtering data set labeled with the second information, and wherein a fourth sub-prediction model of the oil filtering prediction model is a model for distinguishing the warning state from the normal state, the critical state and the fault state of the transformer based on a seventh oil-filtering data set labeled with the first information and an eight oil-filtering data set labeled with the second information.

8. The method of claim 1, wherein a first sub-prediction model of the oil non-filtering prediction model is a model for distinguishing the normal state from the warning state, critical state and the fault state of the transformer and the first sub-prediction model of the oil non-filtering prediction model is trained based on a first oil non-filtering data set and a second oil non-filtering data set as input in a case in which the oil filtering has not been performed.

9. The method of claim 8, wherein a second sub-prediction model of the oil non-filtering prediction model is a model for distinguishing the warning state from the normal state, the critical state and the fault state based on a third oil non-filtering data set labeled with the first information and a fourth oil non-filtering data set labeled with the second information, wherein a third sub-prediction model of the oil non-filtering prediction model is a model for distinguishing the critical state from the normal state, the warning state and the fault state based on a fifth oil non-filtering data set labeled with the first information and a sixth oil non-filtering data set labeled with the second information, and wherein a fourth sub-prediction model of the oil non-filtering prediction model is a model for distinguishing the fault state from the normal state, the warning state and the critical state based on a seventh oil non-filtering data set labeled with the first information and an eighth oil non-filtering data set labeled with the second information.

10. The method of claim 1, generating the prediction further comprising:

determining whether the transformer data satisfy a condition for generating the prediction, the condition comprising at least one of n pieces of consecutive dissolved gas data or n−1 pieces of the transformer state data corresponding to the n pieces of the consecutive dissolved gas data in a time series.

11. The method of claim 1, wherein a sequence of the sub-prediction models of at least one of the oil filtering prediction model or the oil non-filtering prediction model are sequentially arranged to determine the prediction based on a prediction accuracy.

12. The method of claim 11, wherein the sequence of the sub-prediction models is adaptively changed based on the prediction accuracy.

* * * * *